(12) United States Patent
Thor et al.

(10) Patent No.: US 9,802,624 B2
(45) Date of Patent: Oct. 31, 2017

(54) VEHICLE ADAPTED FOR AUTONOMOUS DRIVING AND A METHOD FOR DETECTING OBSTRUCTING OBJECTS

(71) Applicant: VOLVO CAR CORPORATION, Gothenburg (SE)

(72) Inventors: Mikael Thor, Gothenburg (SE); Stefan Solyom, Olofstorp (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/593,233

(22) Filed: Jan. 9, 2015

(65) Prior Publication Data
US 2015/0198951 A1    Jul. 16, 2015

(30) Foreign Application Priority Data

Jan. 16, 2014   (EP) .................................... 14151460

(51) Int. Cl.
| | |
|---|---|
| G01C 22/00 | (2006.01) |
| B60W 50/14 | (2012.01) |
| B60W 10/04 | (2006.01) |
| B60W 10/20 | (2006.01) |
| B60W 10/22 | (2006.01) |
| G05D 1/00 | (2006.01) |

(52) U.S. Cl.
CPC ............ *B60W 50/14* (2013.01); *B60W 10/04* (2013.01); *B60W 10/20* (2013.01); *B60W 10/22* (2013.01); *G05D 1/0066* (2013.01); B60W 2050/143 (2013.01); B60W 2510/202 (2013.01); B60W 2510/22 (2013.01); B60W 2710/202 (2013.01); B60W 2710/22 (2013.01); G05D 2201/0213 (2013.01)

(58) Field of Classification Search
USPC ........................................................ 701/23
See application file for complete search history.

(56) References Cited

U.S. PATENT DOCUMENTS

| 5,598,164 | A | 1/1997 | Reppas et al. | |
|---|---|---|---|---|
| 8,473,173 | B1 | 6/2013 | Robles | |
| 8,521,364 | B2 * | 8/2013 | Hueger | B62D 15/0285 701/36 |
| 2004/0267420 | A1 * | 12/2004 | Tanaka | B62D 15/0285 701/36 |
| 2005/0060073 | A1 * | 3/2005 | Tanaka | B62D 15/0285 701/36 |

(Continued)

FOREIGN PATENT DOCUMENTS

WO    2010101393 A2    9/2010

OTHER PUBLICATIONS

Extended European Search Report dated May 28, 2014, Application No. 141514604-1752, Applicant Volvo Car Corporation, 7 Pages.

*Primary Examiner* — Hussein A Elchanti
(74) *Attorney, Agent, or Firm* — Brooks Kushman P.C.

(57) ABSTRACT

The present disclosure relates to a vehicle adapted for autonomous driving, such as an autonomous vehicle, comprising an assisting object detecting system for detecting obstructing objects to the vehicle. The object detecting system is adapted to detect an object by comparing a reference value of a selected parameter with a measured value of the selected parameter. The present disclosure also relates to a method and a computer program product for use in the vehicle.

22 Claims, 3 Drawing Sheets

(56) References Cited

U.S. PATENT DOCUMENTS

| | | | |
|---|---|---|---|
| 2005/0270177 A1* | 12/2005 | Mori | B60T 7/12 340/932.2 |
| 2007/0027598 A1* | 2/2007 | Mori | B60W 10/06 701/41 |
| 2009/0259365 A1* | 10/2009 | Rohlfs | B62D 15/028 701/41 |
| 2010/0070138 A1* | 3/2010 | Schoening | B60Q 9/004 701/42 |
| 2010/0259420 A1* | 10/2010 | Von Reyher | B62D 15/028 340/932.2 |
| 2010/0286872 A1* | 11/2010 | Endo | B62D 7/159 701/41 |
| 2011/0120797 A1* | 5/2011 | Kitahata | B62D 5/04 180/443 |
| 2011/0304477 A1* | 12/2011 | Yoshihashi | B60W 50/14 340/932.2 |
| 2012/0133767 A1* | 5/2012 | Muramatsu | B60R 1/00 348/148 |
| 2013/0088578 A1* | 4/2013 | Umezawa | G06T 7/0075 348/47 |
| 2013/0231824 A1* | 9/2013 | Wilson | G05D 1/0246 701/26 |
| 2014/0019027 A1* | 1/2014 | Kojima | B60L 15/2081 701/102 |
| 2016/0001774 A1* | 1/2016 | Nakada | B60W 10/04 701/22 |

* cited by examiner

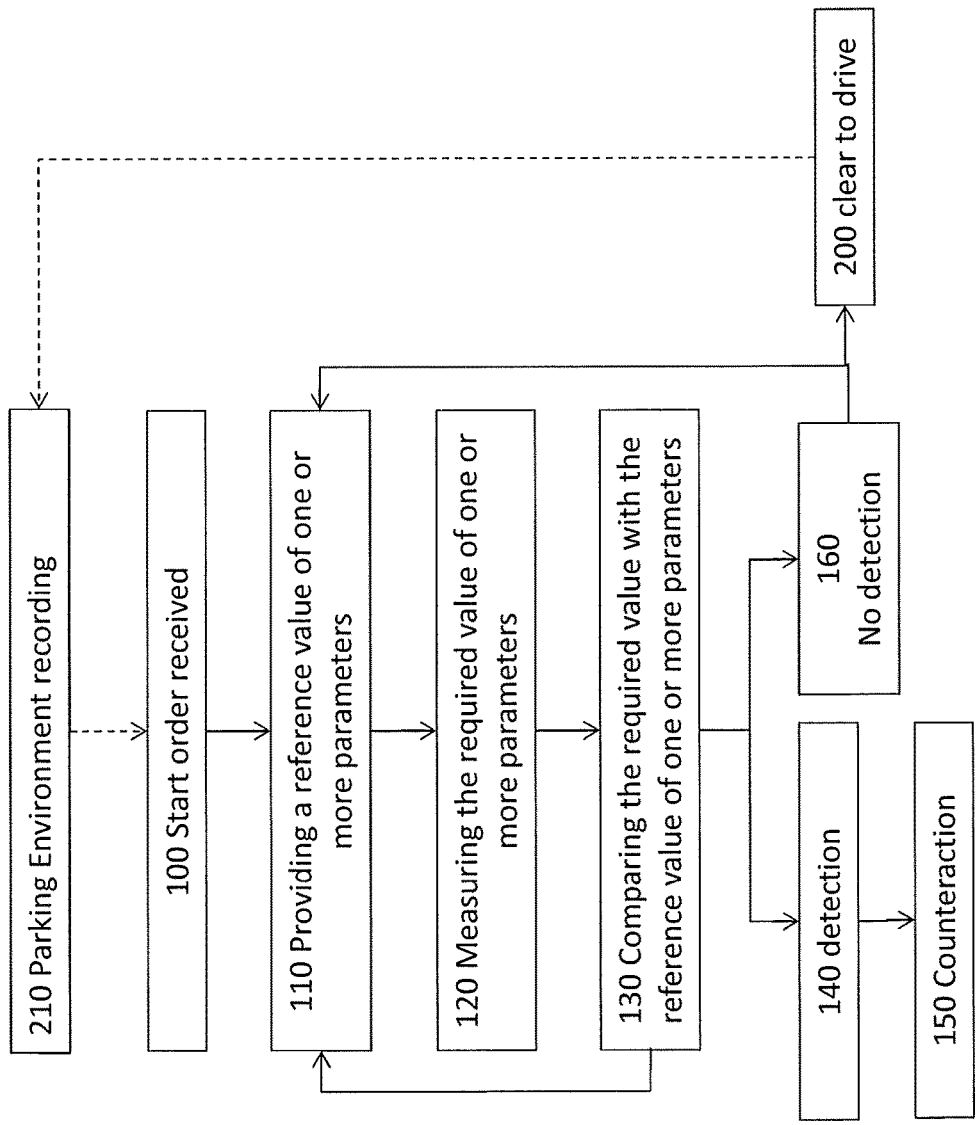

VEHICLE ADAPTED FOR AUTONOMOUS DRIVING AND A METHOD FOR DETECTING OBSTRUCTING OBJECTS

CROSS-REFERENCE TO RELATED APPLICATIONS

This application claims foreign priority benefits under 35 U.S.C. §119(a)-(d) to European patent application number EP 14151460.4, filed Jan. 16, 2014, which is incorporated by reference in its entirety.

TECHNICAL FIELD

A vehicle adapted for autonomous driving comprising an assisting object detection system. A method for detecting obstructing objects to a vehicle adapted for autonomous driving. The vehicle and method are adapted to detect an obstructing object during initial motion of the vehicle. The object detection system is especially useful to detect an obstructing object in low speeds such as below 1 m/s.

BACKGROUND

An autonomous vehicle is a vehicle capable of fulfilling the human transportation capabilities of a traditional vehicle but without human input. Generally these vehicles tend to rely on radar, computer vision, Lidar, and sensors of different kind. Vehicles having autonomous driving systems, especially vehicles such as autonomous vehicles, run the risk of accidentally hitting objects not intended to. Some autonomous vehicles have a 360 degree sensor field of view to detect if an object is within a defined risk zone and thus risking to get hit by the autonomous vehicle. The high safety requirements impart equally high demands on the vehicle systems. For autonomous vehicles, the safety requirements are very high as the human is completely removed from the decision- and interaction process of driving the vehicle.

A problem with existing autonomous vehicles and especially some autonomous driving systems are however that they tend to be insensitive for objects which are not moving and less sensitive during initial motion of the vehicle. A particularly difficult scenario is when the vehicle is parked and the autonomous driving systems are shut down. The vehicle is vulnerable during such period as the vehicle cannot keep track of its surroundings and objects may be positioned around or underneath the vehicle which the vehicle cannot detect with the autonomous driving systems when the vehicle starts. If the operator of the autonomous vehicle at that time requests the vehicle to move, the vehicle or the objects may be damaged, as the ordinary autonomous driving systems may not detect the object, or may not yet have enough data to draw the correct conclusions about the micro traffic situation, i.e., the imminent surroundings of the vehicle.

The published U.S. Pat. No. 8,473,173 B1 discloses a vehicle having an automatic braking system. The automatic braking system can be provided with sensors to detect a trigger event. If a trigger event is detected the automatic braking system is actuated. The U.S. Pat. No. 5,598,164 discloses a system for warning a driver. The system detects if an obstacle is present at the front, rear or at the sides of the vehicle. If an obstacle is detected, the vehicle is prevented from moving forward or backwards. The system e.g., uses heat sensors, motion sensors or radars to detect the objects. Both the mentioned solutions above rely heavily on the use of proximity sensors to detect the objects.

There is however a need to provide improved methods and vehicles for detecting obstructing objects which may have been positioned to obstruct the vehicle when the normal autonomous driving systems are not in use, or to provide a complementary detection function to a vehicle which effectively limits the risk for accidents with objects in the near surrounding when the vehicle starts from a standstill position.

SUMMARY

It is an object of the present disclosure to provide an improved vehicle adapted for autonomous driving and a method for detecting an obstructing object which removes at least one drawback or at least provides a useful alternative. The objective is at least partly met by a vehicle adapted for autonomous driving. The vehicle comprises a propulsion unit, a computer processing unit and an autonomous driving system comprising at least one sensor. The computer processing unit is configured to compare at least one selected reference value of a selected parameter with at least one measured value representative of the selected parameter, to provide for an assisting object detecting system adapted to detect an obstructing object during initial motion of the vehicle.

It is further an object of the present disclosure to provide for a computer program and a method for detecting an obstructing object to a vehicle during initial motion of the vehicle. The vehicle is adapted for autonomous driving. The method comprising the steps of;

a) providing at least one reference value of a selected parameter;

b) obtaining at least one measured value representative of the selected parameter;

d) comparing the at least one reference value of a) with the at least one measured value of b), whereby the outcome of the comparison is used as an indication of an obstructing object to the vehicle.

The vehicle, method and computer program each provide a detection system which improves and assists the existing autonomous driving system of the vehicle. The detection system is intended to operate during initial motion of the vehicle. Initial motion of the vehicle is preferably considered to be when the vehicle has a speed of 0 m/s and up to 1 m/s, during a distance of at most 10 meters from a standstill position, i.e., from a position in which the velocity of the vehicle is 0 m/s. By this the vehicle, method and computer program may estimate the propulsion torque and/or steering torque which is predicted to be required for the vehicle to move and compare it with an estimation of the delivered propulsion torque and/or steering torque which were required making the vehicle move.

The vehicle can be an automobile comprising a fully automatic parking system, or an autonomous vehicle. An automobile such as a car usually has a driver operating the automobile but can in some situations have autonomous functions such as when parking using a fully automatic parking system.

According to an embodiment, the at least one selected parameter is a vehicle state. The vehicle state can be selected from the non-exhaustive list of; propulsion unit torque, steering torque, suspension pressure, or combinations thereof. The vehicle state can be measured using vehicle state sensors. Using the torque as a selected parameter has been found to be advantageous as it can be directly or indirectly measured and is relatively predictable. The necessary propulsion unit torque to move the vehicle can be predicted by relating to a measured value of the imparted torque to the wheels for the vehicle in a similar environment. A reference value can be provided by measuring environmental parameters such as the type of road, state of the road, the geographical location of the vehicle, the angle of the vehicle with respect to a horizontal plane i.e., is the vehicle parked in a slope and in which direction of the slope.

The steering torque can be used in a similar manner to detect an object present on the road obstructing one of the wheels. If the steering wheel of the vehicle is obstructed it can be measured by an increased imparted steering torque to the steering wheel, which is higher than what can be expected.

The object detecting system is especially useful during initial motion of the vehicle. The object detecting system can thus be disengaged when the vehicle exceeds a predetermined speed and/or distance from a standstill position. Disengaging the system does not compromise the safety of the vehicle as the vehicles ordinary autonomous driving system controls the vehicle during motion of the vehicle. The predetermined speed can be 1 m/s, and the predetermined distance can be 10 m.

According to an aspect, the reference value is provided from a locally stored data base. The data based can be stored in a memory circuitry for example such as a hard drive. A locally stored data base can be advantageous as the vehicle may not always have access to external information, such as internet access, via Wi-Fi, 3G, 4G or 5G networks or the like. If the vehicle has access to such or similar networks, the reference value can be provided from a remotely stored data base. It is further possible to use such function to confirm a locally stored reference value with a remotely stored reference value, or vice versa.

According to an aspect, the at least one reference value is provided from an estimation of the required propulsion torque and/or the required steering torque. An estimation of the required propulsion torque and/or steering torque can be made by using the existing vehicle sensors by e.g., measuring the temperature, the condition of the road, estimating the friction between the tires and the road etc. An estimated value may further be used to confirm a value from a locally or remotely stored data base.

The at least one measured value is preferably obtained during a vehicle speed ≤1 m/s, preferably ≤0.5 m/s, more preferably ≤0.3 m/s, even more preferably ≤0.1 m/s. The vehicle adapted for autonomous driving and the method for detecting an obstructing object is advantageously configured to measure the selected parameter from start, or at the very early motion of the vehicle. Hence the lower the speed of the vehicle, the easier the measurements and the predictions will be. Further, to prevent accidents, or minimize the damages thereof, it is advantageous that the vehicle moves slowly.

The at least one measured value is preferably obtained before the vehicle has travelled a distance of 10 m, preferably 5 m, more preferably 3 m, or substantially within a distance which corresponds to the distance between the main wheel axles of the vehicle, i.e., the distance between the wheel axles of the vehicle which are the furthest apart from each other. After the vehicle has travelled the selected distance from a standstill position, it can be assured that no object is obstructing the vehicle and the vehicle can rely solely on its ordinary autonomous driving system.

According to an aspect, a confirmation of an obstructing object can be achieved if the reference value deviates from the measured value. If the reference value is not directly comparable with the measured value, one or both of them may need to be converted to a comparable format. The deviation is used as an indication that an object is obstructing the vehicle. The deviation can be calculated as a percentage of the at least one measured value and the reference value, the deviation being at least 10%. For example if the measured value is 10% higher than the reference value, the processing unit is permitted to initiate an action such as stopping the vehicle and sending an alarm signal.

The vehicle preferably comprises an electrical propulsion unit, such as an electrical motor, although the propulsion unit can be a combustion motor or a hybrid motor. The at least one measured value can be obtained by measuring the amount of electricity and/or fuel consumed by the propulsion unit.

The present disclosure also relates a computer program product for use in a vehicle adapted for autonomous driving and during initial motion of the vehicle. The vehicle comprises a propulsion unit and an autonomous driving system comprising at least one sensor, a computer processing unit. The computer program product comprises code instructions configured for execution by the processing unit and which code instructions when executed in the vehicle causes the vehicle to:

a) provide at least one reference value of a selected parameter;

b) obtain at least one measured value representative of the at least one selected parameter;

d) comparing the reference value of a) with the at least one measured value of b), whereby the outcome of said comparison is used as an indication of an obstructing object to the vehicle.

BRIEF DESCRIPTION OF THE DRAWINGS

Non-limiting embodiments of the present disclosure will be described in greater detail with reference to the accompanying drawings in which:

FIG. 3 shows a flow diagram representing a method for detecting an obstructing object to a vehicle adapted for autonomous driving during initial motion of the vehicle

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
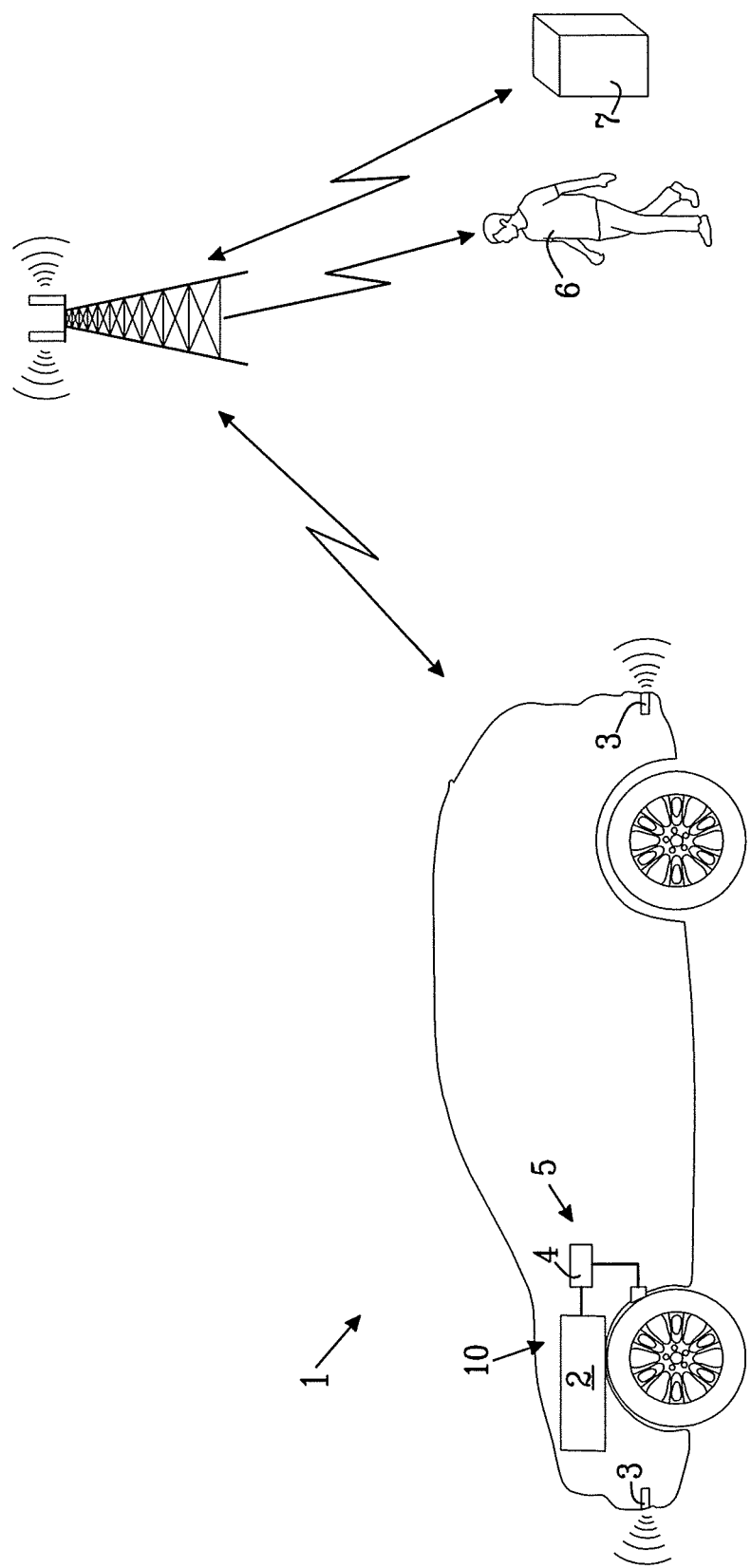
FIG. 1 shows a vehicle adapted for autonomous driving.

FIG. 1 shows a vehicle 1 adapted for autonomous driving, in this case an autonomous vehicle. The vehicle 1 comprises at least one motor 2 which can be one or more of a combustion motor, an electric motor or combinations thereof. A vehicle having both a combustion motor and an electric motor for its propulsion are herein referred to as a hybrid.

It should be noted that the vehicle 1 is intended to operate on public roads. The autonomous driving system 5 of the vehicle 1 should thus be capable of dealing with traffic situations occurring on public roads. The vehicle 1 can be a car, a lorry, a tractor or the like adapted for autonomous driving.

The vehicle 1 can be provided with collision mitigation systems (CMS) or collision avoidance for driver assistance systems (CADS) using proximity sensors 3. The proximity sensors 3 can be radar, laser, Lidar, and/or camera sensors for example. Common for proximity sensors are that they have a limited field of view. The vehicle 1 further comprises a computer processing unit (CPU) 4 which together with the proximity sensors 3 form an autonomous driving system 5 adapted to permit the vehicle 1 to operate without a driver. The vehicle 1 can be provided with additional systems such a communication system permitting the vehicle 1 to communicate with data bases 7, other vehicles, a remotely positioned owner or driver, and/or a remote control system permitting remote control of the vehicle. The processing unit 4 may further be provided with, or communicate with, a memory circuitry, e.g., a separate memory device arranged in the vehicle or in a remote location.

As one skilled in the art will understand, the processing unit 4 may include a microprocessor, microcontroller, programmable digital signal processor (DSP) or another programmable device. The processing unit 4 may also, or instead, include an application specific integrated circuit (ASIC), a programmable gate array or programmable array logic, a programmable logic device, or a digital signal processor (DSP). Where the processing unit 4 includes a programmable device such as a microprocessor, microcontroller or programmable digital signal processor, the processing unit may further include a memory or storage for storing computer executable code (e.g., instructions) that controls operation of the programmable device.

A user 6 may summon the vehicle 1 from a parking lot (not shown in FIG. 1), for example using a mobile phone. The vehicle 1 can at this stage automatically locate the user using the position of the phone from which the vehicle 1 was summoned. When the vehicle 1 is moving towards the person summoning the vehicle, or towards any other position which the user has instructed the vehicle 1 to drive, the vehicle 1 uses the ordinary autonomous driving system 5 to identify an accepted route, to predict and avoid obstacles such as moving or stationary objects.

The vehicle 1 comprises an object detecting system 10 adapted to assist the ordinary autonomous driving system 5, especially during initial motion of the vehicle 1 when the vehicle 1 starts from a standstill position. The object detecting system 10 is configured to detect obstructing objects which prevent the vehicle 1 from initial displacement and/or which obstruct the vehicle 1 from displacement a limited distance. Such objects can be stones, tree logs, or other non-living physical objects. One scenario could be that a bag has been positioned underneath the vehicle 1 or immediately in front of the vehicle 1. In a case were an object is positioned immediately in front of the vehicle 1, or under the vehicle 1, when the vehicle 1 is in a standstill position the ordinary autonomous driving system 5 has severe difficulties to detect the object.

The object detecting system 10 uses an algorithm which provides at least one reference value, e.g., a series of reference values, which are indicative or representative of a predictable parameter. The object detecting system 10 thereafter measures a value representative of the selected parameter and compares it with the at least one reference value to get an indication or a determination if the vehicle 1 is prevented to move or if it is obstructed only after a shorter distance. The object detecting system 10 can use the existing CPU 4 or an additional CPU.

Figure 2A:
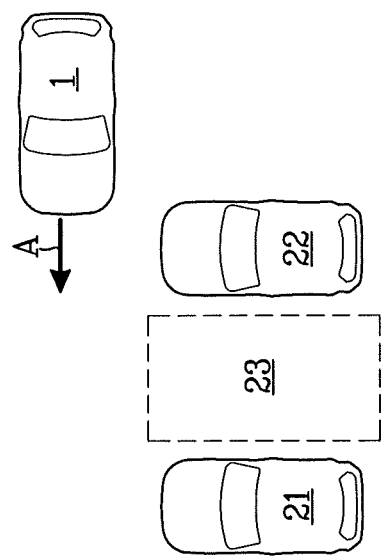
FIGS. 2A-2E show a parking and start scenario for the vehicle of FIG. 1.
Figure 2B:
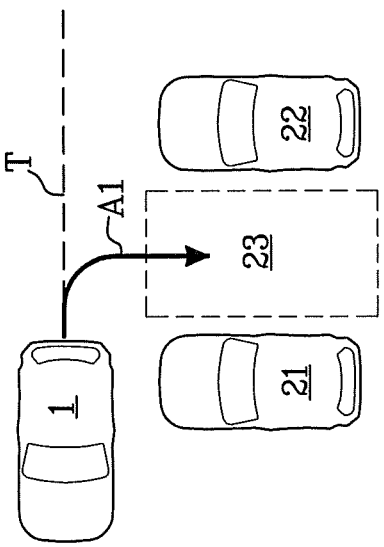
Figure 2C:
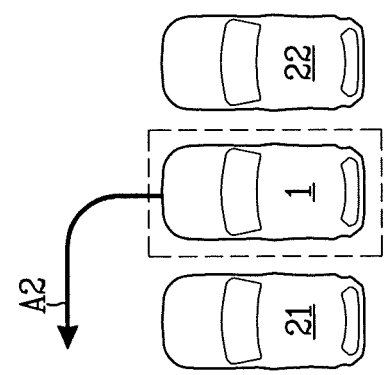

FIGS. 2A-2C show the vehicle 1 during autonomous driving in a parking scenario in which the vehicle 1 parks in a parking lot, and a start scenario, at which the vehicle 1 drives away from the parking lot. FIG. 2A shows the vehicle 1, a first and a second parked car 21, 22 and an intended parking space 23 in which the vehicle 1 is intended to park. An Arrow A indicates the intended route the vehicle 1 is intended to move.

In FIG. 2B the vehicle 1 has passed the parking space 23 and stopped, ready to drive in reverse to the parking space 23 as indicated with the arrow A1. The travelled route is indicated with a dashed line T. When the vehicle 1 is in the position shown in FIG. 2A or 2B, the object detecting system 10 starts to analyze the surroundings of the vehicle 1 using existing systems on the vehicle 1. The object detecting system 10 can scan the intended or travelled route symbolized with the arrows A, A1 in FIGS. 2A-2B, which the vehicle 1 is intended move to enable the vehicle 1 to park in the parking space 23. Bumps in the road, objects laying the path of the intended route are recorded.

FIG. 2C shows the vehicle 1 after parking and in a standstill position in the parking space 23. The just travelled routes T and T1 have been analyzed and recorded by the object detecting system 10.

Figure 2D:
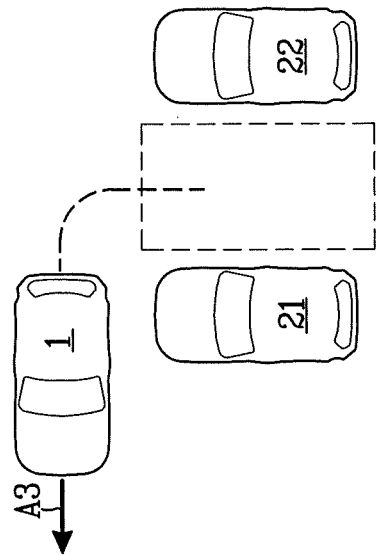
Figure 2E:
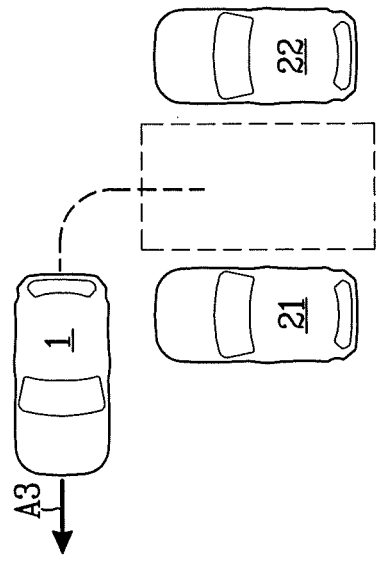

FIG. 2D shows the vehicle 1 after the vehicle 1 has received instructions to drive to a preselected destination. The destination could be any geographical position accessible by the vehicle 1, such as the current location of a user summoning the vehicle 1 using a mobile phone. The arrow A2 indicates the intended route which the vehicle 1 is intended to travel initially from the standstill position.

According to an embodiment, the object detecting system 10 uses the required torque utilized to move the vehicle 1 to estimate if an object is obstructing the vehicle. When the vehicle 1 is about to move, the object detecting system 10 measures the required torque to initially move the vehicle 1. If the required torque exceeds an expected torque, the object detecting system 10 can conclude that an object is obstructing the vehicle 1 and react accordingly. A suitable reaction would be to brake and stop the vehicle 1. Additional reactions could be to send a signal to the user comprising information about the vehicle status, such as that an object is obstructing the vehicle.

It is advantageous that the speed of the vehicle 1 is initially very low at start. A low initial speed will reduce the probability that the vehicle 1 is causing an accident or at least reduce the consequences of an accident. A suitable speed is equal to or below 1 m/s (meters/second), preferably ≤0.5 m/s, more preferably ≤0.3 m/s, more preferably ≤0.1 m/s. The low initial speed is advantageously kept for a predetermined distance. The predetermined distance can be selected dependent on the length of the vehicle 1. An appropriate distance is the distance between the wheel axles of the vehicle 1. If the distance between the wheel axles is 3.0 m, the selected suitable speed is kept until the vehicle 1 has moved 3.0 m.

The object detecting system 10 can use the required steering torque to steer the wheels of the vehicle 1 to estimate if an object is obstructing the vehicle. When the vehicle 1 is about to move, the object detecting system 10 measures the required steering torque to initially move the steering wheels of the vehicle 1. If the required steering torque exceeds an expected steering torque, the object detecting system 10 can conclude that an object is obstructing the vehicle 1 and react accordingly. It should be noted that this can also be done when the vehicle is in a standstill position. Hence by using the method and the object detecting system described herein, it is possible to detect an obstructing object when the vehicle speed is 0 m/s.

The object detecting system 10 can use the active suspension system of the vehicle 1. The active suspension system can be used to detect if an object is obstructing the vehicle 1. For example, the pressure inside a suspension piston, e.g., hydraulic piston, can be measured and compared with an expected value of the pressure inside of the suspension piston. When the vehicle 1 is moving, the object detecting system 10 can measure the pressure inside of the suspension piston, or the compression of the suspension piston. If the measurement is suddenly increasing when it is not expected or predicted to increase, this can be used as an indication that an object is positioned in front of the wheel. The object detecting system 10 can thus conclude that an object is obstructing the vehicle 1 and react accordingly.

The object detecting system 10 can use an accelerometer of the vehicle 1 to estimate if an object is obstructing the vehicle. When the vehicle 1 is moving, the object detecting system 10 can detect if a signal from an accelerometer is deviating from an expected signal to conclude that an object is obstructing the vehicle 1 and react accordingly.

The object detecting system 10 can be configured to analyze the proximal environment around the vehicle 1 before coming to a standstill position, approximately within a radius of a distance similar to the distance between the wheel axles of the vehicle 1, e.g., from 4-10 m. One way of analyzing the proximal environment is that the vehicle 1 drives the intended route a short distance and record, or track, parameters indicative of the properties of the route. When the vehicle 1 later is ordered to move, the intended route has been "scouted" by the vehicle itself, and the collected data can be used and compared with measured data during the initial motion of the vehicle 1. If an object is positioned in front of the vehicle 1, this object can be detected even when the vehicle starts from a standstill position.

It may further analyze or detect the angle of the vehicle 1. The angle of the vehicle 1 can be the angle which the vehicle 1 has with respect to a horizontal line. If the vehicle 1 is parked on a hillside facing the top, the vehicle may have an angle of about 10 degrees with respect to the horizontal line. The accelerometers of the vehicle can be used to detect the angle and incorporate such information when determining the required torque to move the vehicle 1.

A suitable counteraction by the object detecting system 10 when detecting an obstructing object can be to communicate to the CPU 4 to brake and stop the vehicle 1. Additional actions could be to send a signal to the user comprising information about the vehicle status, such as that an object is obstructing the vehicle. Other actions can be to send a visual-, audio-, tactile signal, or combinations thereof, to nearby persons.

The present disclosure also relates to a method for detecting an obstructing object, the method will be described in greater detail with reference to FIG. 3.

At 100, the vehicle 1 receives an order via a remote control to move to a selected destination. The vehicle may respond to the remote control that the signal is received.

At 110, the vehicle 1 analyzes the environment and the vehicle status to provide at least one reference value of a selected parameter. It is advantageous if several reference values are provided for different parameters so that when the vehicle is moving, any parameter which deviates from the measured value can form a basis for a counteraction. For explanatory description, the vehicle 1 identifies that the vehicle is parked on a flat asphalt surface, or asphalt like surface, and that the torque imparted to the wheels is appropriate to measure for identifying a possible obstructing object. The active suspension system is consulted to determine if the vehicle 1 is loaded with additional load. Reference values of the required torque when starting from a flat asphalt based surface is stored in the vehicle memory data base. To confirm the reference value of the vehicle memory data base, the vehicle 1 sends a confirmation request to a remote server which return with a new reference value, or confirms that the stored reference value is correct. Optionally the vehicle 1 can request a reference value directly from the remote server. In this embodiment, the vehicle 1 comprises an electrical motor which distributes torque to the two front wheels. Reference values of the required electricity, i.e., the required current, to move the vehicle is thus identified and/or selected.

At 120, the vehicle 1 is starting to move very slowly. While the vehicle 1 is moving, the selected parameter is measured. As the vehicle is starting to move, the torque imparted to the wheels is estimated by measuring a value representative of the torque imparted to the wheels, in this case the used electricity. The electricity, i.e., the required current, can be measured using the electrical motor itself. The electrical motor, or motors, if several are present, can thus be used both as a torque generator and a torque sensor.

At 130, the reference value of the required amount of electricity to move the vehicle 1 is compared with the measured value of the imparted electricity.

At 140, if it is detected that the measured amount of electricity required to move the vehicle 1 is higher than the reference value collected e.g., from a server, it can be concluded that at least one wheels is obstructed by an object.

At 150, the CPU of the vehicle 1 counteracts the findings by stopping the vehicle 1 from moving. Optionally the vehicle 1 can reverse preferably following the same route it came from. The CPU may further inform the remote control of its status, in this case that the arrival of the vehicle 1 at the selected destination may be late due to obstructing objects. The CPU may further call upon assistance, either to the remote control or to a third party.

At 160, if no significant deviation is detected between the reference values, i.e., the amount of predicted electricity required and the measured required electricity is found, the vehicle 1 continues to the compare reference values and measured values until a selected distance has been travelled. Such selected distance can be 3 meters for example. It may further be a set time period. If the vehicle 1 drives at 0.1 m/s, a selected time period can be from 20-50 seconds for example.

At 200, the vehicle 1 accelerates and initiates, or prioritizes, its ordinary autonomous driving system to drive to the selected destination.

At 210, when the vehicle 1 reaches its selected destination, for example when it is within 4-5 meters from its selected destination, the vehicle 1 may start to analyze the selected destination and store vehicle related parameters, such as active suspension system data, accelerometer data, to store the data in the vehicle memory data base for later reference when the vehicle 1 is moving again.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle adapted for autonomous driving, the vehicle comprising:
   a propulsion unit;
   an autonomous driving system configured to control operation of the vehicle without a driver at least during initial motion of the vehicle; and
   an object detecting system configured to assist the autonomous driving system, the object detecting system including at least one vehicle state sensor for use in determining at least one measured value representative of a selected parameter, and a computer processing unit configured to compare at least one selected reference value of the selected parameter with the at least one measured value representative of the selected parameter to detect an obstructing object which prevents or limits initial displacement of the vehicle from a standstill position during initial motion of the vehicle by the autonomous driving system, wherein the selected parameter comprises a vehicle state parameter.

2. The vehicle according to claim 1 wherein the selected vehicle state parameter comprises torque.

3. The vehicle according to claim 1 wherein the selected vehicle state parameter is selected from a list of propulsion unit torque, steering torque, suspension pressure, or combinations thereof.

4. The vehicle according to claim 1 wherein the object detecting system is adapted to be disengaged when the vehicle exceeds a predetermined speed and/or travels a predetermined distance from the standstill position.

5. The vehicle according to claim 4 wherein the predetermined speed is less than or equal to 1 m/s.

6. The vehicle according to claim 4 wherein the predetermined distance is 10 m or less.

7. The vehicle according to claim 1 wherein the vehicle is adapted to measure the at least one measured value representative of the selected parameter during a vehicle speed of ≤1 m/s.

8. The vehicle according to claim 1 wherein the vehicle is adapted to measure the at least one measured value representative of the selected parameter during a vehicle speed of ≤0.1 m/s.

9. The vehicle according to claim 1 wherein the computer processing unit is configured to provide for a counter action when an obstructing object is detected.

10. The vehicle according to claim 9 wherein the counter action includes stopping the vehicle or sending an alarm signal locally or remotely.

11. The vehicle according to claim 1 wherein the autonomous driving system is configured to control operation of the vehicle in response to an order from a remote device to move the vehicle to a selected destination.

12. A method for detecting an obstructing object to a vehicle during initial motion of the vehicle that is controlled by an autonomous driving system without a driver at least during initial motion of the vehicle, the method comprising:
   a) providing or obtaining at least one reference value of a selected parameter, wherein the selected parameter comprises a vehicle state parameter;
   b) obtaining at least one measured value representative of the selected parameter using at least one vehicle state sensor of an object detecting system; and
   c) comparing, by the object detecting system, the at least one reference value with the at least one measured value, wherein the outcome of the comparison is used as an indication of an obstructing object which prevents or limits initial displacement of the vehicle from a standstill position during initial motion of the vehicle by the autonomous driving system.

13. The method of claim 12 further comprising initiating a counter action when an obstructing object is detected.

14. The method according to claim 12 wherein the at least one reference value is obtained from a locally or remotely stored data base.

15. The method according to claim 12 wherein the at least one reference value is based on an estimation of required propulsion torque and/or required steering torque.

16. The method according to claim 12 wherein the at least one measured value is obtained during a vehicle speed ≤1 m/s.

17. The method according to claim 12 wherein the at least one measured value is obtained before the vehicle has travelled a distance of 10 m.

18. The method according to claim 12 wherein the comparison is determined as a percentage of the at least one measured value and the at least one reference value.

19. The method according to claim 12 wherein the at least one measured value is obtained by measuring amount of electricity or fuel consumed by a propulsion unit of the vehicle.

20. The method according to claim 12 wherein the selected vehicle state parameter is selected from a list of propulsion unit torque, steering torque, suspension pressure, or combinations thereof.

21. The method according to claim 12 further comprising receiving, from a remote device, an order to move the vehicle to a selected destination, and controlling operation of the vehicle, by the autonomous driving system, in response to the order from the remote device.

22. A computer program product for use in a vehicle adapted for autonomous driving and during initial motion of the vehicle, wherein the vehicle comprises a propulsion unit, an object detecting system including a computer processing unit, and an autonomous driving system configured to control the vehicle without a driver at least during initial motion of the vehicle, the computer program product comprising a non-transitory storage medium having computer executable instructions stored thereon, the instructions comprising:
   instructions configured for execution by the processing unit and which instructions when executed cause the object detecting system to
   a) provide or obtain at least one reference value of a selected vehicle state parameter;
   b) obtain, using at least one vehicle state sensor of the object detecting system, at least one measured value representative of the selected parameter; and
   c) compare the at least one reference value with the at least one measured value, wherein the outcome of the comparison is used as an indication of an obstructing object which prevents or limits initial displacement of the vehicle from a standstill position during initial motion of the vehicle by the autonomous driving system.

* * * * *